Jan. 15, 1957  R. L. TWEEDALE  2,777,287
MOTOR-PUMP DRIVE FOR VEHICLE FAN
Filed Feb. 24, 1953

INVENTOR.
Ralph L. Tweedale 2,777,287

Patented Jan. 15, 1957

United States Patent Office

2,777,287

MOTOR-PUMP DRIVE FOR VEHICLE FAN

Ralph L. Tweedale, Birmingham, Mich., assignor to Vickers Incorporated, Detroit, Mich., a corporation of Michigan Application February 24, 1953, Serial No. 338,460

8 Claims. (Cl. 60—12)

This invention relates to power transmissions, and is particularly applicable to those of the type comprising two or more fluid pressure energy translating devices, one of which may function as a pump and another as a fluid motor.

More particularly the invention relates to such a power transmission especially well adapted for hydraulic operation of motor vehicle accessories.

When regarded as a power source for accessory drives the engine of a motor vehicle has an inherent disadvantage arising from the wide range of speeds traversed during normal operation. Its operating speed may vary from perhaps 400 R. P. M. to 4000 R. P. M., and the output of, for example, a fixed displacement pump driven thereby will vary in the same ratio. The problem is further complicated by the fact that certain accessories, such as a steering booster, may require very substantial amounts of fluid while the engine is idling. To avoid undesirable oversupply of fluid at intermediate and high speeds, hydraulic pumping units have been provided which supply a relatively constant volume of fluid while operating over a wide range of speeds.

During operation in the upper engine speed ranges, cavitation at the pump inlet with its consequent noise and wear, result from the inadequacy of atmospheric pressure for keeping the pump inlet passages full. Various schemes proposed in the past for supercharging the pump inlet passages to maintain them full of fluid have included devices based on the jet pump principle and others providing an additional pump in the circuit. These prior schemes have been generally satisfactory but in a particular application might be objectionable from a cost, space, or operational standpoint.

It is an object of the present invention to provide an improved fluid power transmission particularly well adapted for use on a motor vehicle.

More particularly, it is an object of this invention to provide an improved transmission in which the inlet passages of the pumping mechanism are subjected to supercharging pressure which is automatically generated as the speed of the vehicle increases to the point where such supercharging is required.

The wide speed variation of the vehicle engine is also a serious problem in the case of the engine cooling fan. The fan provided must be of adequate size and driven at sufficient speed to properly cool the engine while idling and at low speeds. At higher engine speeds the vehicle is normally moving at a substantial rate of speed and thus sufficient air for cooling passes through the vehicle radiator without the help of the fan. The speed of the conventionally driven fan has, however, increased directly with the speed of the vehicle engine, and thus uselessly absorbs engine horsepower. Another important objection to conventional fan drives is that high fan speeds generate excessive noise.

It is therefore an object of this invention to provide a fluid power transmission for driving the cooling fan of a motor vehicle which will avoid power waste and noise which results from excessive cooling fan speed.

More particularly it is an object to provide such a transmission which will drive the cooling fan at substantial speeds when required, and relieve the driving force when it is not required.

It is another object of the present invention to provide a fluid power transmission for driving a cooling fan of a motor vehicle in which power losses, due to driving the cooling fan at excessive speeds, are minimized, and in which the inlet passages of the pumping mechanism are automatically supercharged at higher vehicle speeds.

Still another object is to provide such a transmission which utilizes a single pumping mechanism to efficiently drive the cooling fan and at least one other fluid operated accessory.

Further objects and advantages of the present invention will be apparent from the following description, reference being had to the accompanying drawing wherein a preferred form of the present invention is clearly shown.

Figures 1, 2:
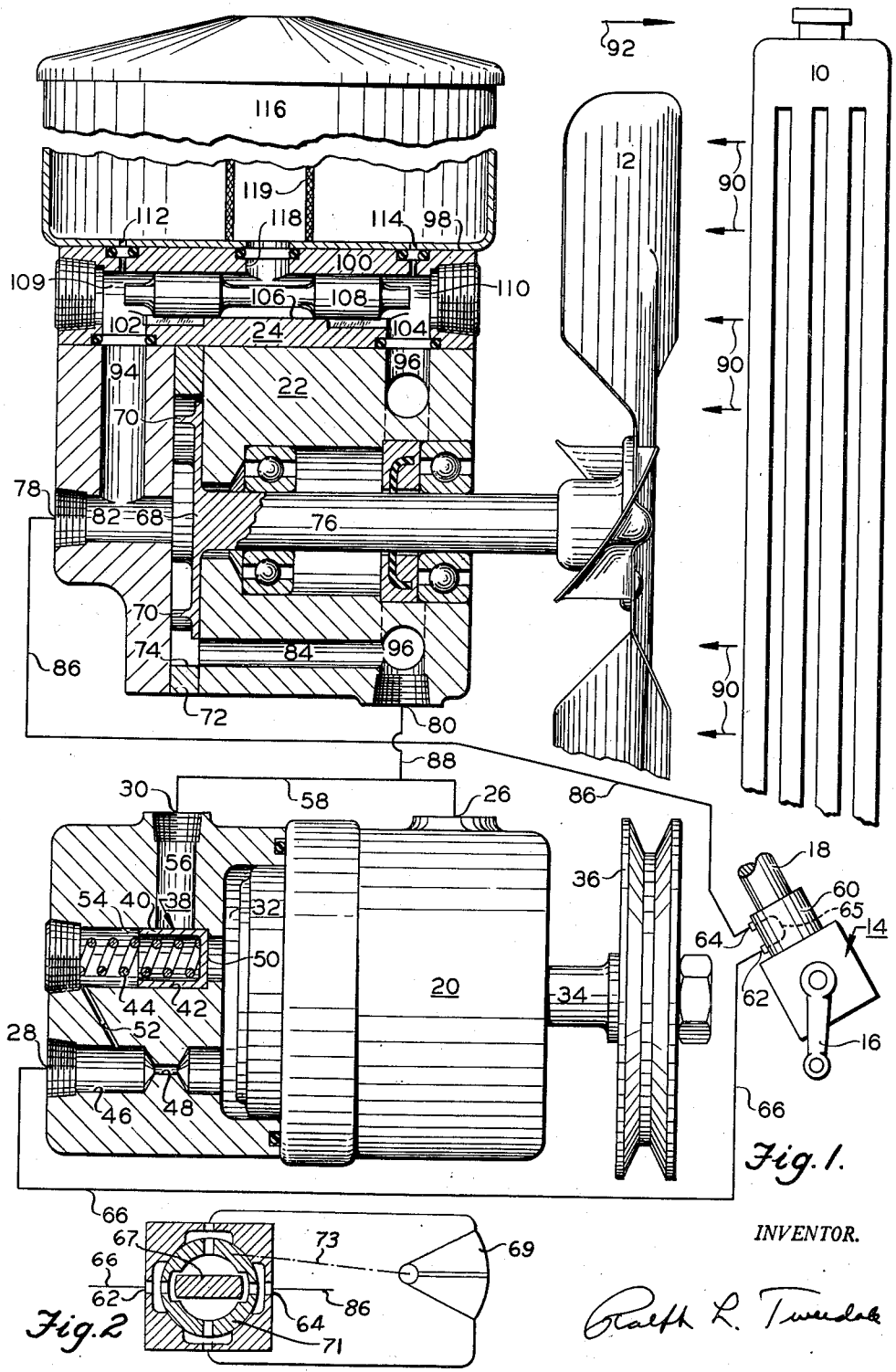
Figure 1 is a diagrammatic view of a hydraulic power transmission embodying a preferred form of the present invention. It is pointed out that because of the schematic nature of the drawing, the positional relation of the various components is not intended to be that which might exist in an actual installation.
Figure 2 is a schematic diagram of the valve and fluid motor of the steering booster which appears in Figure 1.

As heretofore noted, the invention has particular application to motor vehicles. Referring to the drawing, the numeral 10 designates the radiator for the engine cooling liquid of a conventional automobile. The numeral 12 designates the cooling fan which is utilized to cause the passage of sufficient air through the radiator for proper cooling at low vehicle speeds. A hydraulic booster type steering gear, generally designated 14, includes a pitman arm 16 and has a steering shaft 18 extending therefrom. The power transmission includes a pump unit, generally designated 20, and a hydraulic device capable of functioning as either a pump or a motor, generally designated 22. Secured to the top of the device 22 is a combination tank and shuttle valve unit, generally designated 24.

Pumping unit 20 may be of any suitable type but is preferably of the widely used radially sliding vane type. The pump includes an inlet port 26, an outlet port 28, and a bypass port 30. In the pumping mechanism illustrated, the fluid being pumped is transferred from the inlet port 26 to the pressure chamber 32, from which point it can pass to the outlet port 28. Pump 20 is provided with a drive shaft 34 having a V-belt pulley 36 affixed thereto. Pulley 36 is V-belt connected to the engine of the motor vehicle which is not shown.

Because of the direct driving connection between pump 20 and the vehicle engine, the speed of the pump will vary in the same ratio from low to high speed as does the speed of the vehicle engine. Since this ratio from idling to full speed is of the order of 1:10, the output of the fixed displacement pump 20 will vary in the same ratio. Because the pump size must be adequate to satisfactorily operate the accessories at engine idle speed a large oversupply of the fluid results at higher engine speeds. To prevent this fluctuation of fluid supply, a spillover type flow control valve 38 has been provided.

Valve 38 includes a spool 40 slidable in a bore 42. Spool 40 is normally biased to the position illustrated by a spring 44. The delivery passage 46, extending from the pressure chamber 32 to the outlet port 28, includes a constricted portion 48. It can be seen that pressure on the upstream side of the constricted portion 48 is that existing in the pressure chamber 32 of the pump 20, That same pressure is exerted on the end area 50 of spool 40 of the flow control valve. A passage 52 extends from the downstream side of the restriction 48 to the valve bore 42 where it acts on the effective area 54 of spool 40 to oppose the pressure acting on area 50. Increasing flow across the restriction 48 will thus be reflected in a pressure differential across the spool 40 of the flow control valve 38 which, at a desired rate of flow through the passage 46, will overcome the spring 44, thus shifting the spool 40 to the left. A passage 56, extending from the bore 42 to the bypass port 30, is so positioned as to be uncovered by a leftward movement of the spool 40 and place the pressure chamber 32 in communication with the bypass port 30. An external bypass conduit 58 connects the bypass port 30 to the inlet port 26 of the pump 20. As the pump delivery volume increases beyond the cracking point of valve 38, the valve will open wider to bypass the excess delivery. At all speeds above the cracking point of the valve 38, the valve will tend to maintain the pressure drop through the constriction 48 constant, and thus maintain the flow rate therethrough constant.

The steering unit 14 includes a valve housing 60 having an inlet port 62 and an outlet port 64. The valve mechanism, not shown in Figure 1, may be of the conventional open-center type utilized for steering applications and operates in the usual manner to control flow of fluid to a hydraulic motor which aids the force applied by the driver to shaft 18 in moving the pitman arm 16. The dotted line 65 indicates that circulation through the steering unit 14 is from inlet port 62 to the outlet port 64 of unit 14 which may be of any well known construction. A fluid conduit 66 extends from the outlet port 28 of pump 20 to the inlet port 62 of the steering unit. The steering unit thus receives a relatively constant supply of fluid regardless of the speed of the engine of the vehicle.

The internal circuitry of unit 14 is shown schematically in Figure 2. When valve 67 is in the neutral position illustrated, fluid passes freely from port 62 to port 64. As valve 67 is shifted, pressure is increased on one side or the other of motor 69. A follow-up feed back between motor 69 and the valve sleeve 71 is indicated at 73.

The device 22 may be of any type capable of function as either a pump or motor and is illustrated as being of the centrifugal reactive type. The device includes an impeller 68 having a plurality of curved blades 70. The impeller 68 is surrounded by a ring member 72, the interior of which forms the usual volute 74. Extending from the impeller 68 is a drive shaft 76 on which is mounted the cooling fan 12. The device includes an inlet port 78 and an outlet port 80. A passage 82 extends from the inlet port 78 to the center of the impeller 68. A passage 84 extends from the volute 74 to the outlet port 80. A fluid conduit 86 interconnects the outlet port 64 of the steering unit 14 and the inlet port 78 of the device 22. Another fluid conduit 88 extends from the outlet port 80 of the device 22 to the inlet port 26 of the pump 20.

As heretofore described, the flow of fluid from the outlet port 28 of the pump 20 is maintained relatively constant regardless of the speed of the vehicle engine. During operation of the steering unit there may be a quantitative discrepancy between the flow into port 62 and the flow out of port 64 due to fluid utilized in operating the booster. The difference is quite slight and of course the average flow in and the average flow out will be equivalent. Hence, the flow of fluid from the steering unit to the device 22 through the conduit 86 will be substantially constant, and for all practical purposes, at the same rate as flow from port 28 of the pump 20. The fluid thus entering inlet port 78 of the device 22 passes through the passage 82 to the center of the impeller 68, and moves in a substantially radial path to the volute 74 surrounding the impeller. The radially moving fluid exerts a reactive force on the curved blades 70 of the impeller 68, thus driving the shaft 76 and the cooling fan 12. The fluid then passes from the volute 74 to the passage 84 and thence through conduit 88 to the inlet port 26 of the pumping unit 20. The cooling fan 12 of the vehicle is in this manner fluid actuated to a substantially constant speed regardless of the speed of the engine of the vehicle. As heretofore noted, important benefits are derived from such constant speed and operation, the most important being saving in horsepower and a large reduction in noise during high speed operation.

During high speed operation of the pump mechanism, atmospheric pressure is inadequate to completely fill the inlet zones of the pumping mechanism. This failure to completely fill the inlet zones or, as the condition has been termed, cavitation, engenders a number of serious operating difficulties. These difficulties include excessive noise and wear. Cavitation can be avoided by increasing the pressure on the fluid supplied to the pump inlet zone. To eliminate cavitation, supercharge of the pump inlet zones is provided as hereinafter described.

Referring to the drawing, the small arrows 90 indicate direction in which air flow is induced through the radiator 10 by the fan 12. The arrow 92 indicates the direction in which the fan 12 is carried by a movement of the vehicle in its normal direction of operation on the highway. As already discussed, the relatively constant output of pump 20 is series connected to the hydraulic steering unit and to the device 22, thereby operating the fan 12 at a substantially constant speed regardless of the speed of the engine of the vehicle. While the vehicle is stopped or traveling at slow speeds, the speed of the pump 20 will be low and supercharge will not be required. However, the operation of fan 12 for forcing air through the radiator 10 is necessary. Fluid from the pump 20 will thus drive the fan 12 and the fluid pressure in conduit 86 will exceed that in conduit 88. As the speed of the vehicle on the highway increases, however, the speed of the pumping mechanism also increases and it becomes necessary, if cavitation is to be avoided, that the pressure on the pump inlet passages be increased. A further consequence of rapid movement of the vehicle on the highway is that air will be forced through the radiator in sufficient quantities to maintain proper cooling without the aid of fan 12. As heretofore described, the output of pump 20 will tend to drive the fan 12 at a relatively constant speed. During movement of the vehicle down the highway, a point will be reached at which the rate of flow of air through the radiator induced by the car's movement will exceed the rate that it is being forced through by the fan 12 at which time the fan will tend to be rotated by the air passing through the radiator. The fan 12 thus acts as a windmill and tends to drive the impeller 68 of the unit 22 at a greater speed than that produced by fluid from the pump 20. The effect of this change in operation at highway speeds of the vehicle is that the unit 22 ceases to act as a motor and operates as a pump being driven by the fan 12. Operation of unit 22 in the pump has the effect of increasing the pressure in the volute 74 and hence conduit 88, thus increasing the pressure on the inlet zones of the pumping mechanism 20 to produce the supercharge pressure required to prevent cavitation.

The system provided is thus one in which the vehicle cooling fan is driven at the proper speed for most efficient operation while the vehicle is stopped or moving at slow speed, and in which power loss normally resulting from driving the fan at excessively high speeds when not required is eliminated. Further, the system provides for supercharging the inlet of the pump automatically as the pump speed approaches the point where supercharging is needed.

A pair of fluid passages 94 and 96 extend from the passages 82 and 84, respectively, to the top face 98 of the device 22. Secured to the base 98 of the device 22 is a valve block 100 having a pair of passages 102 and 104 which are coincident with the passages 94 and 96, respectively, at the juncture of the device 22 of the valve block 100. Valve block 100 has a valve bore 106 extending therethrough and having a shuttle valve 108 slidably positioned therein. The end chambers 109 and 110 communicate with the passages 102 and 104, respectively, and are connected by a pair of constricted passages 112 and 114 to the interior of the tank 116. A fluid passage 118 extends from the interior of tank 116 to intersect the valve bore 106 intermediate between the end chambers 109 and 110. Fluid from reservoir 116 flowing to passage 118 passes through a filter element 119.

It can be seen that opposing end areas of the shuttle valve 108 are exposed to pressure in end chambers 109 and 110. The valve 108 will thus be moved away from whichever of the chambers 109 or 110 has the higher pressure, and will effect communication, through the central groove thereon, between passage 118 and whichever of the end chambers is at the lower pressure. Unrestricted communication is thus effected between the interior of tank 116 and whichever of the passages 82 or 84 is at the lower pressure. The end chamber 109 or 110, which is isolated by valve 108 from unrestricted communication with the interior of tank 116, is nevertheless in communication therewith through its respective constricted passage 112 or 114. Such an arrangement, while permitting maintenance of an elevated pressure in that chamber effects circuation of a small quantity of working fluid between the high pressure side of the system and the interior of tank 116. This limited amount of fluid flow into the tank through either passage 112 or 114 insures that a portion of the working fluid is continually circulated through the reservoir for purposes of cooling, deaeration, and filtration.

In operation of the system, assume first that the motor vehicle is standing and the engine is idling. Under these conditions the pump 20 will normally discharge its entire output through the outlet passage 46 to the steering booster unit 14, thence through conduit 86 to the device 22 which drives the fan 12 at the speed required for efficient cooling of the vehicle engine. Since the device 22 is being driven as a motor, pressure in passage 82 will exceed that in passage 84 and the shuttle valve 108 will thus be shifted to the right. In this position the interior of tank 116 will be in unrestricted communication with the low pressure side of the system, thus permitting replenishment of leakage losses, etc. The relatively elevated pressure in end chamber 109 will also force a small quantity of fluid through the constricted passage 112 to the interior of tank 116 for purposes of cooling and filtration. Any quantitative discrepancy thus induced in the two sides of the system is made up by flow from the tank through passages 118 and 114.

As the vehicle starts to move down the highway and gain speed, operation will for a time remain as described, except that flow control valve 38 will become operative to bypass sufficient fluid to maintain flow in the outlet passage 46 relatively constant. As the speed of the vehicle continues to increase, however, a point will be reached where air flow against the blades of fan 12 caused by movement of the vehicle, will tend to drive the fan at a faster rate than that induced by delivery of the pump. At this time the device 22 ceases to act as a motor and starts to act as the pump, thus increasing the pressure in the passage 84 to a point higher than that pressure in passage 82. These pressure changes are reflected in the end chambers 109 and 110 and cause the shuttle valve 108 to shift to the left and place passage 82 in unrestricted communication with the interior of tank 116 through the passage 118. Restricted passage 114 now acts in the same manner as did the passage 112 in permitting flow of a limited amount of fluid into tank 116 for purposes heretofore mentioned. The increased pressure in passage 84 caused by operation of unit 22 as a pump is effective to supercharge the inlet of pump 20 at higher vehicle speeds and prevent cavitation.

There has thus been provided a hydraulic power transmission particularly well adapted for efficiently and noiselessly operating various motor vehicle accessories. The invention has provided such a system utilizing low cost, well known hydraulic components. A further advantage lies in the fact that the efficiency and other benefits to be derived in this system may be simply and easily incorporated in conventional motor vehicles. This is especially true since increasingly large numbers of modern motor vehicles are being built with power steering units incorporating pumping mechanism of the general class utilized in this invention.

While the form of embodiment of the invention as herein disclosed constitutes a preferred form, it is to be understoood that other forms might be adopted, all coming within the scope of the claims which follow.

What is claimed is as follows:

1. In a motor vehicle propelled by a variable speed prime mover, the combination of: a cooling fan rotatably disposed in an air space having a forwardly projected area; rotary fluid pumping mechanism having an inlet and an outlet and in a driving relation with the prime mover; flow rate controlling means associated with said pumping mechanism for providing a fluid supply having a substantially constant flow rate throughout a wide range of speeds; a rotary fluid pressure energy translating device having an inlet and an outlet, said device being capable of operation as either a pump or a motor and connected in a driving relation with the cooling fan; and fluid conduit means connecting the outlet of the pumping mechanism to the inlet of the device and the outlet of the device to the inlet of the pumping mechanism in substantially closed communication, whereby at low vehicle speeds the device operates as a motor to drive the fan at a speed in excess of said constant speed and at high vehicle speeds the fan drives the device at a substantially constant speed, causing it to operate as a pump and supercharge the inlet of the pumping mechanism.

2. In a motor vehicle propelled by a variable speed prime mover, the combination of: a cooling fan rotatably disposed in an air space having a forwardly projected area; a reservoir; rotary fluid pumping mechanism having an inlet and an outlet and a driving relation with the prime mover; flow rate controlling means associated with said pumping mechanism for providing a fluid supply having a substantially constant flow rate throughout a wide range of speeds; a rotary fluid pressure energy translating device having an inlet and an outlet, said device being capable of operation as either a pump or a motor and connected in a driving relation with the cooling fan; first and second fluid conduit means respectively connecting the outlet of the pumping mechanism to the inlet of the device and the outlet of the device to the inlet of the pumping mechanism in substantially closed communication, whereby at low vehicle speeds the device operates as a motor to drive the fan at a substantially constant speed and at high vehicle speeds the fan drives the device at a speed in excess of said constant speed, causing it to operate as a pump and supercharge the inlet of the pumping mechanism; and means forming a constricted fluid passage from one of said conduits to said reservoir for circulation of cooling and replenishing oil.

3. In a motor vehicle propelled by a variable speed prime mover, the combination of: a cooling fan rotatably disposed in an air space having a forwardly projected area; a reservoir; rotary fluid pumping mechanism having an inlet and an outlet and in a driving relation with the prime mover; flow rate controlling means associated with said pumping mechanism for providing a fluid supply having a substantially constant flow rate throughout a wide range of speeds; a rotary fluid pressure energy translating device having an inlet and an outlet, said device being capable of operation as either a pump or a motor and connected in a driving relation with the cooling fan; first and second fluid conduit means respectively connecting the outlet of the pumping mechanism to the inlet of the device and the outlet of the device to the inlet of the pumping mechanism in substantially closed communication, whereby at low vehicle speeds the device operates as a motor to drive the fan at a substantially constant speed and at high vehicle speeds the fan drives the device at a speed in excess of said constant speed, causing it to operate as a pump and supercharge the inlet of the pumping mechanism; and means forming a constricted fluid passage from each of said conduits to said reservoir for circulation of cooling and replenishing oil.

4. In a motor vehicle propelled by a variable speed prime mover, the combination of: a cooling fan rotatably disposed in an air space having a forwardly projected area; a reservoir; rotary fluid pumping mechanism having an inlet and an outlet and in a driving relation with the prime mover; flow rate controlling means associated with said pumping mechanism for providing a fluid supply having a substantially constant flow rate throughout a wide range of speeds; a rotary fluid pressure energy translating device having an inlet and an outlet, said device being capable of operation as either a pump or a motor and connected in a driving relation with the cooling fan; first and second fluid conduit means respectively connecting the outlet of the pumping mechanism to the inlet of the device and the outlet of the device to the inlet of the pumping mechanism in substantially closed communication, whereby at low vehicle speeds the device operates as a motor to drive the fan at a substantially constant speed and at high vehicle speeds the fan drives the device at a speed in excess of said constant speeed, causing it to operate as a pump and supercharge the inlet of the pumping mechanism; and valve means operative to effect communication between the reservoir and whichever of said conduits is at the lower pressure.

5. In a motor vehicle propelled by a variable speed prime mover, the combination of: a cooling fan rotatably disposed in an air space having a forwardly projected area; a reservoir; rotary fluid pumping mechanism having an inlet and an outlet and in a driving relation with the prime mover; flow rate controlling means associated with said pumping mechanism for providing a fluid supply having a substantially constant flow rate throughout a wide range of speeds; a rotary fluid pressure energy translating device having an inlet and an outlet, said device being capable of operation as either a pump or a motor and connected in a driving relation with the cooling fan; first and second fluid conduit means respectively connecting the outlet of the pumping mechanism to the inlet of the device and the outlet of the device to the inlet of the pumping mechanism in substantially closed communication, whereby at low vehicle speeds the device operates as a motor to drive the fan at a substantially constant speed and at high vehicle speeds the fan drives the device at a speed in excess of said constant speed, causing it to operate as a pump and supercharge the inlet of the pumping mechanism; and shuttle valve means having opposed areas exposed to pressure in said conduits and operative to effect communication between the reservoir and whichever of said conduits is at the lower pressure.

6. In a motor vehicle propelled by a variable speed prime mover, the combination of: a cooling fan rotatably disposed in an air space having a forwardly projected area; a reservoir; rotary fluid pumping mechanism having an inlet and an outlet and in a driving relation with the prime mover; flow rate controlling means associated with said pumping mechanism for providing a fluid supply having a substantially constant flow rate throughout a wide range of speeds; a rotary fluid pressure energy translating device having an inlet and an outlet, said device being capable of operation as either a pump or a motor and connected in a driving relation with the cooling fan; first and second fluid conduit means respectively connecting the outlet of the pumping mechanism to the inlet of the device and the outlet of the device to the inlet of the pumping mechanism in substantially closed communication, whereby at low vehicle speeds the device operates as a motor to drive the fan at a substantially constant speed and at high vehicle speeds the fan drives the device at a speed in excess of said constant speed, causing it to operate as a pump an supercharge the inlet of the pumping mechanism; means forming a constricted fluid passage from each of said conduits to said reservoir for circulation of cooling and replenishing oil; and valve means operative to effect additional communication between the reservoir and whichever of said conduits is at the lower pressure.

7. In a motor vehicle propelled by a variable speed prime mover, the combination of: a cooling fan rotatably disposed in an air space having a forwardly projected area; a reservoir; rotary fluid pumping mechanism having an inlet and an outlet and in a driving relation with the prime mover; flow rate controlling means associated with said pumping mechanism for providing a fluid supply having a substantially constant flow rate throughout a wide range of speeds; a rotary fluid pressure energy translating device having an inlet and an outlet, said device being capable of operation as either a pump or a motor and connected in a driving relation with the cooling fan; first and second fluid conduit means respectively connecting the outlet of the pumping mechanism to the inlet of the device and the outlet of the device to the inlet of the pumping mechanism in substantially closed communication, whereby at low vehicle specds the device operates as a motor to drive the fan at a substantially constant speed and at high vehicle speeds the fan drives the device at a speed in excess of said constant speed, causing it to operate as a pump and supercharge the inlet of the pumping mechanism; means forming a constricted fluid passage from each of said conduits to said reservoir for circulation of cooling and replenishing oil; and shuttle valve means having opposed areas exposed to pressure in said conduits and operative to effect additional communication between the reservoir and whichever of said conduits is at the lower pressure.

8. In a motor vehicle propelled by a variable speed prime mover, the combination of: a cooling fan rotatably disposed in an air space having a forwardly projected area; rotary fluid pumping mechanism having an inlet and an outlet and in a driving relation with the prime mover; flow rate controlling means associated with said pumping mechanism for providing a fluid supply having a substantially constant flow rate throughout a wide range of speeds; a rotary fluid pressure energy translating device having an inlet and an outlet, said device being capable of operation as either a pump or a motor and connected in a driving relation with the cooling fan; fluid actuated means for operating a second accessory, said means having an inlet and an outlet port; and fluid conduit means connecting, in substantially closed communication, the pump outlet to the fluid actuated means inlet, the fluid actuated means outlet and the device inlet, and the device outlet to the pump inlet, whereby at low vehicle speeds the device operates as a motor to drive the fan at a substantially constant speed and at high vehicle speeds the fan drives the device at a speed in excess of said constant speed, causing it to operate as a pump and supercharge the inlet of the pumping mechanism.

(References on following page)

References Cited in the file of this patent

UNITED STATES PATENTS

| | | |
|---|---|---|
| 2,112,466 | Maloon | Mar. 29, 1938 |
| 2,122,045 | Rose et al. | June 28, 1938 |
| 2,230,760 | Pateras Pescara | Feb. 4, 1941 |
| 2,401,258 | Livers | May 28, 1946 |
| 2,403,325 | Armington | July 2, 1946 |
| 2,594,460 | Lauck | Apr. 29, 1952 |
| 2,603,065 | Sarto | July 15, 1952 |